United States Patent
Wang et al.

(10) Patent No.: US 12,264,079 B2
(45) Date of Patent: Apr. 1, 2025

(54) SODA ASH AND SODIUM BICARBONATE PRODUCTION METHOD

(71) Applicant: CHINA TIANCHEN ENGINEERING CORPORATION, Tianjin (CN)

(72) Inventors: Jigang Wang, Tianjin (CN); Lixiang Lu, Tianjin (CN); Qingtian Feng, Tianjin (CN)

(73) Assignee: CHINA TIANCHEN ENGINEERING CORPORATION, Tianjin (CN)

( * ) Notice: Subject to any disclaimer, the term of this patent is extended or adjusted under 35 U.S.C. 154(b) by 354 days.

(21) Appl. No.: 18/061,994

(22) Filed: Dec. 5, 2022

(65) Prior Publication Data

US 2023/0103792 A1    Apr. 6, 2023

Related U.S. Application Data

(63) Continuation of application No. PCT/CN2021/106179, filed on Jul. 14, 2021.

(30) Foreign Application Priority Data

Feb. 3, 2021 (CN) .......................... 202110147796.3

(51) Int. Cl.
*C01D 7/12* (2006.01)
*C01D 7/24* (2006.01)
*C01D 7/26* (2006.01)

(52) U.S. Cl.
CPC .............. *C01D 7/126* (2013.01); *C01D 7/24* (2013.01); *C01D 7/26* (2013.01)

(58) Field of Classification Search
CPC ............. C01D 7/126; C01D 7/24; C01D 7/26
(Continued)

(56) References Cited

U.S. PATENT DOCUMENTS 5,283,054 A    2/1994   Copenhafer et al.
6,589,497 B2   7/2003   Smith
(Continued)

FOREIGN PATENT DOCUMENTS

CN    118996154 A  * 11/2024
EP    4400479 A2   *  7/2024  ............... C01D 1/22

OTHER PUBLICATIONS

CN 202110147796.3, Notification to Grant Patent Right for Invention, mailed May 7, 2022, 10 pages. (with English translation).
(Continued)

*Primary Examiner* — Melissa S Swain
(74) *Attorney, Agent, or Firm* — Getech Law LLC; Jun Ye

(57) ABSTRACT

A soda ash and sodium bicarbonate production method is provided, in which solution mining, pretreatment, stripping, concentration, sodium carbonate decahydrate crystallization, separation, dissolution, sodium carbonate monohydrate crystallization, separation and drying are performed to obtain dense soda ash. A dissolved sodium carbonate decahydrate solution or a concentrated brine 3 is subjected to crystallization, separation and drying to produce sodium bicarbonate. A discharge liquid 1 generated in the sodium carbonate decahydrate crystallization and separation is subjected to causticization and evaporation to recycle sodium carbonate. Causticized sludge generated in causticization is calcined and then recycled for causticization. The process provided herein maximizes the resource utilization.

10 Claims, 1 Drawing Sheet

(58) Field of Classification Search
USPC .......................................................... 423/422
See application file for complete search history.

(56) References Cited

U.S. PATENT DOCUMENTS

| | | | |
|---|---|---|---|
| 7,255,841 B2 | 8/2007 | Kurtz | |
| 7,507,388 B2 | 3/2009 | Ceylan et al. | |
| 7,645,435 B2 * | 1/2010 | Braman | C01D 7/24 |
| | | | 423/427 |
| 9,051,627 B2 | 6/2015 | Walravens et al. | |
| 9,593,023 B2 * | 3/2017 | Vandendoren | C01D 7/24 |
| 2007/0140945 A1 * | 6/2007 | Copenhafer | C01F 11/18 |
| | | | 423/165 |
| 2015/0132203 A1 * | 5/2015 | Vandendoren | C01D 1/22 |
| | | | 423/183 |
| 2017/0183237 A1 * | 6/2017 | Vandendoren | C01D 1/42 |

OTHER PUBLICATIONS

International Search Report of PCT/CN2021/106179.

* cited by examiner

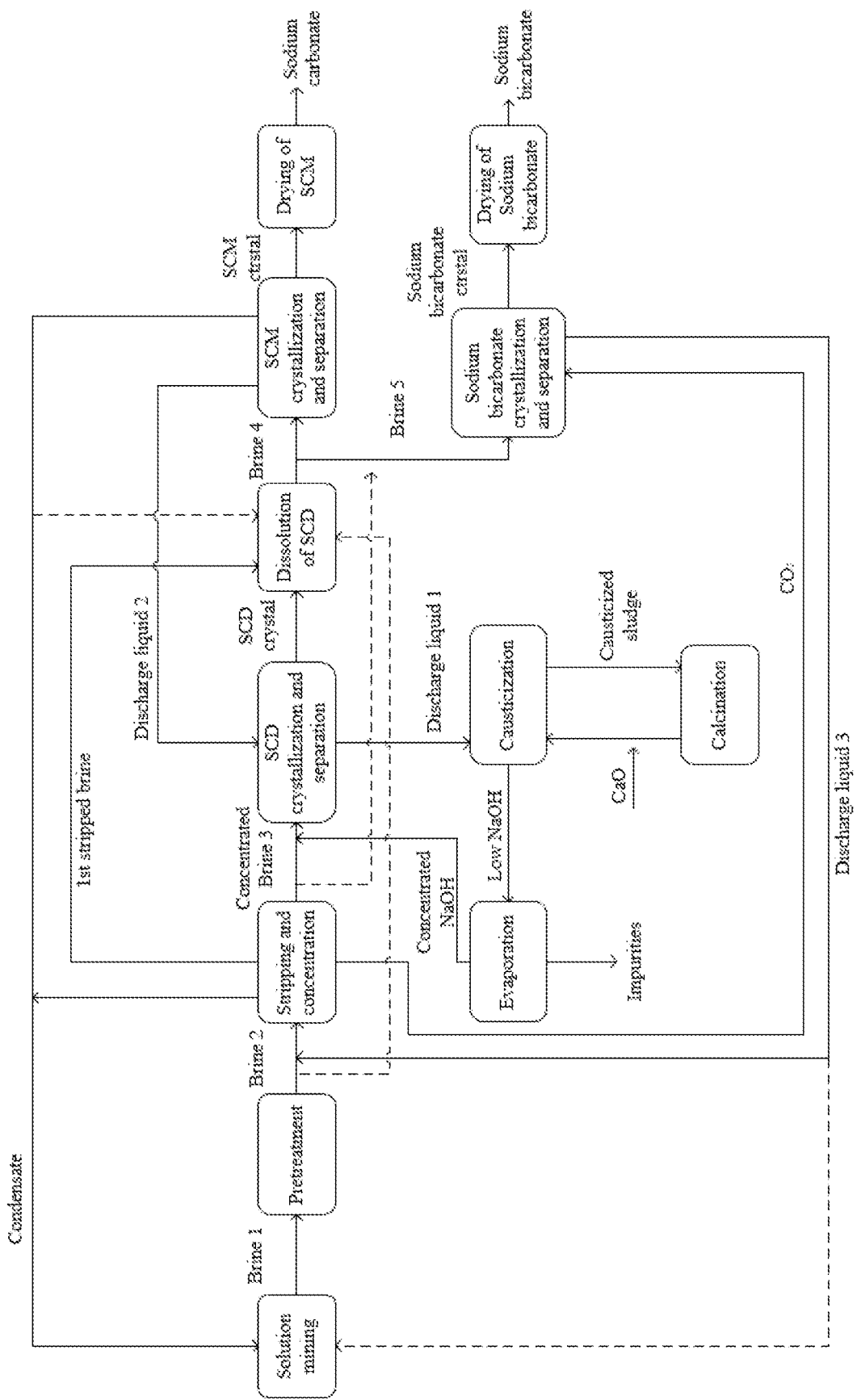

SODA ASH AND SODIUM BICARBONATE PRODUCTION METHOD

CROSS REFERENCE OF RELATED APPLICATIONS

This application is a continuation of PCT Patent Application No. PCT/CN2021/106179, filed Jul. 14, 2021, entitled "TRONA PRODUCTION PROCESS," which claims foreign priority of Chinese Patent Application No. 202110147796.3, filed Feb. 3, 2021 in the China National Intellectual Property Administration (CNIPA), the entire contents of which are hereby incorporated by reference in their entireties.

TECHNICAL FIELD

This application relates to soda ash and sodium bicarbonate production, and more particularity to a soda ash and sodium bicarbonate production process from trona ore.

BACKGROUND

Natural soda ash is mainly produced by processing trona ore ($Na_2CO_3 \cdot NaHCO_3 \cdot 2H_2O$) or nahcolite ($NaHCO_3$) solution through a sodium carbonate monohydrate process.

U.S. Pat. No. 6,589,497 B2 describes a soda ash production method. Mine brine is subjected to steam stripping, evaporation, neutralization, monohydrate crystallization, centrifugation and drying to obtain soda ash products. Mother liquid obtained by centrifugation was recycled through a sodium carbonate decahydrate crystallization step. Mother liquid obtained by separating the sodium carbonate decahydrate is abandoned without further recycle.

U.S. Pat. No. 5,283,054 describes a soda ash production method. Brine is subjected to stripping & evaporation to decompose most of sodium bicarbonate. The remaining sodium bicarbonate is subjected to neutralization with an aqueous sodium hydroxide solution and then precipitating sodium carbonate decahydrate crystal. The carbonate decahydrate crystal are dissolved for producing sodium carbonate monohydrate crystal, and then dense soda ash is obtained. This process requires large capacity of carbonate decahydrate. Mother liquid obtained by separating the carbonate decahydrate crystal are partially abandoned and not being fully recycled to prevent impurities accumulation.

U.S. Pat. No. 7,507,388 B2 and Chinese Patent Application Publication No. 1772615A describes a soda ash and sodium bicarbonate production method. Brine is subjected to purification and preheating, evaporation and stripping, monohydrate crystallization, centrifugation and drying to obtain dense soda ash. Mother liquid obtained by centrifuging the monohydrate crystal is partially recycled through a sodium carbonate decahydrate crystallization unit. Other parts of the mother liquid are subjected to causticization and filtration to obtain a sodium hydroxide solution, and then used for sodium carbonate decahydrate production. Mother liquid obtained by separating the carbonate decahydrate crystal are abandoned and not being fully recycled. In addition, only low concentration sodium hydroxide solution, normally 10% can be obtained by causticization and filtration unit.

U.S. Pat. No. 9,593,023 B2 describes a process for producing sodium carbonate/sodium bicarbonate. Brine is treated by stripping, neutralization and evaporation to obtain concentrated brine. The concentrated brine is subjected to crystallization in a sodium carbonate monohydrate crystallizer or sodium bicarbonate crystallizer, and then subjected to separation to obtain sodium carbonate crystal or sodium bicarbonate crystal. Mother liquid separated from crystallizer is subjected to causticization and concentration to obtain sodium hydroxide (NaOH) solution with a concentration higher than 25 wt. %, and then recycled to crystallizer or upstream. The NaOH solution can be produced by treating a discharge liquid separated in anhydrous sodium carbonate, sodium carbonate monohydrate, sodium carbonate decahydrate, sodium sesquicarbonate or sodium bicarbonate crystallization process. If the NaOH solution is produced by treating discharge liquid from sodium carbonate decahydrate crystallizer, the feed of sodium carbonate decahydrate crystallizer is limited to monohydrate purge.

U.S. Pat. No. 7,255,841 B2 describes a process for producing soda ash and sodium bicarbonate. Waste stream of sodium carbonate plant is used for sodium carbonate decahydrate crystallization. The resulted sodium carbonate decahydrate crystal is used to produce sodium bicarbonate. By means of the process, the waste-water discharged in sodium carbonate decahydrate plant and sodium bicarbonate plant is less than sodium carbonate monohydrate plant, effectively reducing the amount of waste stream and recycling the alkali.

U.S. Pat. No. 9,051,627 describes a process for sodium bicarbonate production through a sodium carbonate solution containing at least 2 wt % sodium chloride and/or sodium sulfate. A portion of the ammonium carbonate solution is from an anhydrous sodium carbonate crystallizer, a sodium carbonate monohydrate crystallizer, a sodium carbonate heptahydrate crystallizer, a sodium carbonate decahydrate crystallizer, a sodium sesquicarbonate crystallizer, or a wegscheiderite crystallizer.

SUMMARY

Accordingly, the present disclosure provides a soda ash and sodium bicarbonate production method from trona ore, in which solution mining, pretreatment, stripping and concentration, sodium carbonate decahydrate crystallization and separation, dissolution of sodium carbonate decahydrate, sodium carbonate monohydrate crystallization, separation and drying are performed to obtain dense soda ash. A part of dissolved sodium carbonate decahydrate solution (brine 5) and/or a part of concentrated brine 3 is subjected to crystallization, separation and drying to produce sodium bicarbonate. Mother liquid separated from decahydrate sodium carbonate unit is causticized and evaporated to produce sodium hydroxide solution, which is added to the production of soda ash. Sludge generated in causticizing unit is separated and calcined then recycled to causticizing unit to reduce raw limestone consumption. By this process, the resource can be maximum utilized.

Technical solution of the disclosure is described as follows.

This application provides a soda ash and sodium bicarbonate production method, comprising:

(S1) solution mining injecting water into one of (a) trona ore ($Na_2CO_3 \cdot NaHCO_3 \cdot 2H_2O$), (b) nahcolite ore ($NaHCO_3$) and (c) wegscheiderite ore to obtain raw brine 1; or obtaining the brine 1 from a salt lake or other underground brine well, wherein the raw brine 1 contains sodium carbonate and/or sodium bicarbonate, soluble impurities such as sodium sulfate and/or sodium chloride, insoluble suspended solids and total organic carbon (TOC);

(S2) pretreatment
removing suspended solid and/or TOC in the raw brine 1 to obtain a brine 2;
(S3) stripping and concentration
subjecting the brine 2 to stripper to convert most of sodium bicarbonate in the brine 2 to sodium carbonate to obtain a concentrated brine 3; subjecting the concentrated brine 3 to neutralization with sodium hydroxide (NaOH) to remove residual sodium bicarbonate;
(S4) crystallization and separation
subjecting the concentrated brine 3 to crystalize at low-temperature in a sodium carbonate decahydrate crystallizer and then separated to obtain a low liquid residual sodium carbonate decahydrate crystal and a discharge liquid 1;
(S5) dissolution of sodium carbonate decahydrate
dissolving the sodium carbonate decahydrate crystal to obtain a dissolved sodium carbonate decahydrate solution; and dividing the dissolved sodium carbonate decahydrate solution into two parts, respectively a brine 4 and a brine 5;
(S6) sodium carbonate monohydrate crystallization, separation and drying
subjecting the brine 4 to evaporation, concentration, crystallization in a sodium carbonate monohydrate crystallizer and separation to obtain a low liquid residual sodium carbonate monohydrate crystal and a discharge liquid 2; drying the sodium carbonate monohydrate crystal to obtain dense soda ash; mixing the discharge liquid 2 with the concentrated brine 3 to obtain a mixed solution; neutralizing the mixed solution; and feeding the mixed solution to the sodium carbonate decahydrate crystallizer followed by crystallization and separation;
(S7) sodium bicarbonate crystallization, separation and drying
subjecting the brine 5 to carbonation reaction with carbon dioxide in a sodium bicarbonate crystallizer, cooling, crystallization and separation to obtain a low liquid residual sodium bicarbonate crystal and a discharge liquid 3, wherein the discharge liquid 3 is collected to be recycled to step (S3) and/or used in step (S1) as injection solvent; and drying the sodium bicarbonate crystal to obtain sodium bicarbonate;
(S8) causticization
subjecting the discharge liquid 1 and lime milk to causticization, followed by clarification and separation to obtain a low NaOH content solution and causticized sludge; and subjecting the causticized sludge to washing and calcination to obtain quick lime to be reused for causticization; and
(S9) subjecting the low NaOH content solution to evaporation and concentration, wherein sodium carbonate, sodium chloride and/or sodium sulfate in the NaOH solution are crystallized by concentration; separating impurities to obtain a concentrated NaOH solution, which can be used for neutralization of residual sodium bicarbonate in the concentrated brine 3.

In some embodiments, condensates generated in step (S3) and step (S6) are collected for solution mining (S1).

In some embodiments, the process further comprises:
removing TOC in the discharge liquid 1; and/or
removing TOC in the low NaOH content solution obtained in step (S8) or the concentrated NaOH solution obtained in step (S9).

In some embodiments, the TOC is removed through activated carbon adsorption, ozonation or resin adsorption, preferably activated carbon adsorption.

In some embodiments, a total alkali of the concentrated brine 3 is 22-28 wt. % in terms of sodium carbonate.

In some embodiments, in step (S5), the sodium carbonate decahydrate crystal is dissolved with the brine 2, a condensate generated in step (S6), a condensate generated in step (S3), stripped brine generated in step (S3) or a combination thereof.

In some embodiments, $CO_2$ generated in step (S3) is collected for the carbonation reaction in step (S7); and in step (S7), the brine for crystallization is replaced with the concentrated brine 3, or a mixed solution of the concentrated brine 3 and the brine 5.

In some embodiments, a concentration of the concentrated NaOH solution obtained in step (S9) is 20-35 wt %, preferably 25-30 wt %.

In some embodiments, the sodium carbonate decahydrate crystallization comprises two-stage flash evaporators and a crystallizer; the mixed solution of the discharge liquid 2 and the concentrated brine 3 sequentially passes through the two-stage flash evaporators and the crystallizer for crystallization to obtain sodium carbonate decahydrate; and the second-stage flash evaporator and crystallizer are both equipped with a bottom stirring mechanism.

In some embodiments, in step (S4), a refrigerating system is provided for sodium carbonate decahydrate crystallization, which also supplying heat for dissolving of sodium carbonate decahydrate; and a condenser at outlet of the compressor of the refrigerating system is a two-stage series condenser, wherein the first-stage condenser unit is configured to take a dissolved sodium carbonate decahydrate solution containing sodium carbonate decahydrate crystal as a cooling source.

In some embodiments, in step (S2), the solid particles in the brine 1 are removed through a sand filter and/or mechanical filter with online cleaning device.

In some embodiments, multi-stage stripping and concentration is performed, preferably two-stage steam stripping and two-stage concentration.

In some embodiments, two stripping towers are provided for stripping, respectively a first-stage stripping tower and second-stage stripping tower; and liquid from the first-stage stripping tower is the 1st stripped brine.

In some embodiments, a crystallization temperature of sodium carbonate decahydrate is 15-30° C.; and a crystallization temperature of sodium carbonate monohydrate is 35-109° C.

In some embodiments, a three-effect evaporation process or a mechanical vapor recompression (MVR) process is performed in step (S9); at least a portion of soluble salt impurities is crystallized and discharged in step (S9); and the soluble salt impurities are sodium carbonate, sodium chloride and/or sodium sulfate.

In some embodiments, a centrifuge is provided for the sodium carbonate decahydrate crystal separation.

In some embodiments, a centrifuge is provided for the sodium carbonate monohydrate crystal separation.

In some embodiments, the lime milk used for causticization is obtained by reacting calcium oxide (CaO) and water in a lime slaker; the water is from the brine 1, the brine 2, the condensate generated in step (3), the condensate generated in step (6) or a combination thereof.

In some embodiments, before calcination, the causticized sludge is required to be washed to control sodium content in calciner. In some embodiments, a horizontal vacuum belt filter is provided for washing. In some embodiments, the sodium content in calciner feedstock is controlled not higher than 0.5 wt %.

In some embodiments, a rotary kiln is provided for calcination in step (8).

Compared to the prior art, this application has the following beneficial effects.

(1) Regarding the process provided herein, sodium carbonate decahydrate production process, sodium carbonate monohydrate production process and caustic soda production process by causticization are organically combined to treat the trona ore mine or the nahcolite mine with high sodium chloride/sodium sulfate content. Sodium carbonate decahydrate is produced firstly, and then used to produce sodium carbonate monohydrate, such that sodium chloride/sodium sulfate content is effectively reduced in final product. Meanwhile, the discharge liquid 1 generated in sodium carbonate production is subjected to causticization to obtain sodium hydroxide to be used for sodium carbonate decahydrate production, which reduces effluent emission, recycles the discharge liquid, and solve problems of purchasing difficulty of sodium hydroxide required in trona production in remote areas.

(2) A two-stage flash evaporation and crystallization in series process is used in sodium carbonate decahydrate crystallization to stepwise reduce the operation pressure of flash evaporation and crystallization. A flash vapor of each stage is controlled to optimize crystallization. By means of gradient flash evaporation, crystal formation during crystallization can be better controlled. In addition, the second-stage flash evaporator and crystallizer are equipped with stirring mechanism in bottom thereof, which enables a faster liquid surface replacement in the second-stage flash evaporator and crystallizer, accelerating removal of water and facilitating generation of larger crystal particle size.

(3) Though a two-stage serial condensation in refrigerating system, in which a first-stage condenser unit is configured to take a dissolved sodium carbonate decahydrate solution containing sodium carbonate decahydrate crystal as a cooling source to reduce an amount of cooling water. Meanwhile, the first-stage condenser unit provides heat to dissolve sodium carbonate decahydrate, effectively reducing energy consumption through thermal coupling.

(4) Compared with a concentrated brine used in prior art, the dissolved sodium carbonate decahydrate solution is used to produce sodium bicarbonate. Since the dissolved sodium carbonate decahydrate solution, especially the solution dissolved by condensate, has a lower sodium chloride/sodium sulfate content, less impurities and better quality of sodium bicarbonate can be achieved.

BRIEF DESCRIPTION OF THE DRAWINGS

The accompanying drawings are merely illustrative of the embodiments of the disclosure, and should not be considered as limitations to this application.

FIG. 1 is a flow chart of a soda ash and sodium bicarbonate production method according to an embodiment of the present invention.

DETAILED DESCRIPTION OF EMBODIMENTS

It should be noted that the features of various implementing embodiments may be combined to form further embodiments of the disclosed concepts.

The disclosure will be clearly and completely described below with reference to the accompanying drawings and embodiments.

Embodiments 1-2 are performed for mining alkali mines in the same area.

Embodiment 1

As shown in FIG. 1, a soda ash and sodium bicarbonate production method includes the following steps.

(S1) 65-75° C. water (with 2 wt % of sodium carbonate) is pumped into a trona ore ($Na_2CO_3 \cdot NaHCO_3 \cdot 2H_2O$) mine to obtain a 2284 t/h brine 1. The brine 1 mainly includes 12.78 wt % of sodium carbonate ($Na_2CO_3$), 7.5 wt % of sodium bicarbonate ($NaHCO_3$), 1.5 wt % of sodium chloride (NaCl) and 0.11 wt % of sodium sulfate ($Na_2SO_4$); and a total suspended solid (TSS) is 50 ppm.

(S2) Pretreatment

The brine 1 is subjected to pretreatment to reduce the TSS to 10 ppm to obtain a brine 2.

(S3) Stripping and Concentration

The brine 2 is subjected to two-stage steam stripping and concentration to obtain a concentrated brine 3, where the concentrated brine 3 includes 21~24 wt % $Na_2CO_3$, 1.5~3 wt % $NaHCO_3$, 2.02 wt % NaCl and 0.15 wt % $Na_2SO_4$.

(S4) Decahydrate Crystallization and Separation

The concentrated brine 3 is subjected to neutralization by a concentrated sodium hydroxide solution, low-temperature crystallization and separation to produce 1078 t/h of sodium carbonate decahydrate crystal and 330 t/h of discharge liquid 1. The discharge liquid 1 mainly includes 11~15 wt % $Na_2CO_3$, 0~1 wt % $NaHCO_3$, 8.5~13 wt % NaCl and 0.8~1.4 wt % $Na_2SO_4$.

A sodium carbonate decahydrate crystallizer includes two-stage flash evaporators and a crystallizer. A mixed solution of the discharge liquid 2 and the concentrated brine 3 sequentially passes through the two-stage flash evaporators and the crystallizer after neutralized for crystallization to obtain sodium carbonate decahydrate. Second-stage flash evaporator and crystallizer are both equipped with a bottom stirring mechanism.

A refrigerating system is provided for cooling during sodium carbonate decahydrate crystallization, and for supplying heat to dissolve sodium carbonate decahydrate; and a condenser at outlet of the compressor of the refrigerating system is a two-stage series condenser. The first-stage condenser unit is configured to take a dissolved sodium carbonate decahydrate solution containing sodium carbonate decahydrate crystal as a cooling source.

(S5) Dissolution of Sodium Carbonate Decahydrate

The sodium carbonate decahydrate crystal is dissolved by a 1st stripped brine produced in step (S3) to obtain 1660 t/h of dissolved sodium carbonate decahydrate solution with a total alkali of 27-30 wt % in terms of sodium carbonate. About 1570 t/h of sodium carbonate decahydrate solution are taken as a brine 4 to produce sodium carbonate monohydrate, and the remained sodium carbonate decahydrate solution is taken as a brine 5 to produce sodium bicarbonate.

(S6) Sodium Carbonate Monohydrate Crystallization, Separation and Drying

The brine 4 is subjected to evaporation, concentration, crystallization and separation to obtain 375 t/h of sodium carbonate monohydrate crystal and 476 t/h discharge liquid 2. The discharge liquid 2 mainly includes 26~30 wt % $Na_2CO_3$, 1~2 wt % $NaHCO_3$ and 2~3 NaCl. Crystallization temperature is 104° C. The sodium carbonate monohydrate crystal is dried to obtain 316 t/h of sodium carbonate products with 99.79% of sodium carbonate and less than 1000 ppm NaCl content.

Moreover, the mixed solution of the concentrated brine 3 and the discharge liquid 2 is subjected to neutralization and then fed to sodium carbonate decahydrate crystallization and separation.

(S7) Sodium Bicarbonate Crystallization, Separation and Drying

The brine 5 is subjected to carbonation reaction with carbon dioxide in a sodium bicarbonate crystallizer, cooling, crystallization to obtain a sodium bicarbonate crystal. Crystallization temperature is 70-80° C. The sodium bicarbonate crystal is subjected to separation and drying to obtain 25.3 t/h sodium bicarbonate products and about 66 t/h discharge liquid 3. The products contain 99.75 wt % $NaHCO_3$, while NaCl content is about 400 ppm. The discharge liquid 3 is mixed with the brine 2, and then used in step (S3).

Compared with a concentrated brine used in prior art, the dissolved sodium carbonate decahydrate solution is used to produce sodium bicarbonate. Since the dissolved sodium carbonate decahydrate solution has lower sodium chloride/sodium sulfate content, less impurities and better quality of sodium bicarbonate is achieved.

(S8) Causticization

The discharge liquid 1 is subjected to causticization to obtain approximately 296 t/h of 7~9 wt % NaOH solution and approximately 54 t/h causticized sludge. The causticized sludge includes 32.3 t/h of calcium carbonate. The causticized sludge is subjected to calcination to obtain 13 t/h of active calcium oxide. An amount of makeup calcium oxide is 6.6 t/h.

Before calcination, the causticized sludge is subjected to washing by a horizontal vacuum belt filter to control sodion content in calciner feedstock. The sodion content in calciner feedstock is not higher than 0.5 wt %. The rotary kiln is provided for calcination.

(S9) Evaporation

The NaOH solution is subjected to three-effect evaporation process to obtain about 76 t/h of 30 wt % concentrated NaOH solution, in which TOC content is 0.6-0.9 wt %. Meanwhile, about 43 t/h of impurities, mainly sodium chloride and calcium carbonate, are discharged. The TOC in the concentrated NaOH solution is reduced to less than 0.35 wt % by means of a TOC removing device. Then the concentrated NaOH solution is used to neutralize the mixture of concentrated brine 3 and discharge liquid 2.

Regarding the process of Embodiment 1, a total amount of sodium from the trona ore mine is about 174 t/h. 316.8 t/h of sodium carbonate and 25.3 t/h sodium bicarbonate are produced. About 45 t/h of sodium carbonate are returned to the trona ore mine with water to be used in step (S1). Other sodium is lost in production process. A utilization efficiency of sodium is about 94.2%.

Embodiment 2

As shown in FIG. 1, a soda ash and sodium bicarbonate production method includes the following steps.

(S1) 65-75° C. water (with 2 wt % of sodium carbonate) is pumped into a trona ore ($Na_2CO_3 \cdot NaHCO_3 \cdot 2H_2O$) mine to obtain a 2206 t/h brine 1, where the brine 1 mainly includes 12.78 wt % of $Na_2CO_3$, 7.5 wt % of $NaHCO_3$, 1.2 wt % of NaCl and 0.11 wt % of $Na_2SO_4$; and a TSS is 50 ppm.

(S3) Pretreatment

The brine 1 is subjected to pretreatment to reduce the TSS to 10 ppm to obtain a brine 2.

(S3) Steam Stripping and Concentration

The brine 2 is subjected to two-stage steam stripping-concentration to obtain a concentrated brine 3, where the concentrated brine 3 includes 21-24 wt % $Na_2CO_3$, 1.5-3 wt % $NaHCO_3$, 1.7 wt % NaCl and 0.16 wt % $Na_2SO_4$.

(S4) Decahydrate Crystallization and Separation

The concentrated brine 3 is subjected to neutralization with a concentrated sodium hydroxide solution, low-temperature crystallization and separation to produce 1000 t/h of sodium carbonate decahydrate crystal and 258 t/h of discharge liquid 1. The discharge liquid 1 mainly includes 11-15 wt % $Na_2CO_3$, 0-1 wt % $NaHCO_3$, 8.5-13 wt % NaCl and 0.8-1.4 wt % $Na_2SO_4$.

(S5) Dissolution of Sodium Carbonate Decahydrate

The sodium carbonate decahydrate crystal is dissolved by a 1st stripped brine produced in step (S3) to obtain 1500 t/h of sodium carbonate decahydrate solution with a total alkali of 27-30 wt % calculated by sodium carbonate. About 1410 t/h of sodium carbonate decahydrate solution are taken as a brine 4 to produce sodium carbonate monohydrate, and the remained sodium carbonate decahydrate solution is taken as a brine 5 to produce sodium bicarbonate.

(S6) Sodium Carbonate Monohydrate Crystallization, Separation and Drying

The brine 4 is subjected to evaporation, concentration, crystallization and separation to obtain 375 t/h of sodium carbonate monohydrate crystal and 336 t/h discharge liquid 2. The discharge liquid 2 mainly includes 26-30 wt % $Na_2CO_3$, 1-2 wt % $NaHCO_3$ and 2-3.5 NaCl. Crystallization temperature is 104° C. The sodium carbonate monohydrate crystal is dried to obtain 316 t/h of sodium carbonate products with 99.79% of sodium carbonate and NaCl content is less than 1000 ppm.

Moreover, the mixed solution of the concentrated brine 3 and the discharge liquid 2 is subjected to neutralization and then feed to sodium carbonate decahydrate crystallization and separation.

(S7) Sodium Bicarbonate Crystallization, Separation and Drying

The brine 5 is subjected to carbonation reaction with carbon dioxide in a sodium bicarbonate crystallizer, cooling, crystallization to obtain a sodium bicarbonate crystal. Crystallization temperature is 70-80° C. The sodium bicarbonate crystal is subjected to separation and drying to obtain 25.3 t/h sodium bicarbonate products and about 66 t/h discharge liquid 3. The products contain 99.75 wt % $NaHCO_3$, while NaCl content is about 400 ppm. The discharge liquid 3 is mixed with the brine 2, and then is used in step (S3).

(S8) Causticization

The discharge liquid 1 is subjected to causticization to obtain approximately 245 t/h of 8-11 wt % NaOH solution and approximately 58 t/h causticized sludge. The causticized sludge includes 33.68 t/h of calcium carbonate. The causticized sludge is mixed with 12.6 t/h makeup calcium oxide, and then subjected to calcination to produce 18.9 t/h active calcium oxide.

Before calcination, the causticized sludge is subjected to washing by a horizontal vacuum belt filter to control sodion content in calciner feedstock. The sodion content in calciner feedstock is not higher than 0.5 wt %. A rotary kiln is provided for calcination.

(S9) Evaporation

The NaOH solution is subjected to three-effect evaporation process to obtain about 78 t/h of 30 wt % concentrated NaOH solution, in which a TOC content is 0.6-0.9 wt %. Meanwhile, about 43 t/h of impurities, mainly sodium chloride and calcium carbonate, are discharged. The TOC in the concentrated NaOH solution is reduced to less than 0.35 wt % by means of a TOC removing device. Then the concentrated NaOH solution is used to neutralize the mixture of concentrated brine 3 and discharge liquid 2.

Regarding the process of Embodiment 2, a total amount of sodium from the trona ore mine is about 170 t/h. 316.8 t/h of sodium carbonate and 25.3 t/h sodium bicarbonate are produced. About 45 t/h of sodium carbonate are returned to the trona ore mine with water to be used in step (S1). Other sodium is lost in the production process. A utilization efficiency of sodium is about 96.5%.

Comparative Embodiment

A process of the Comparative embodiment is performed as U.S. Pat. No. 5,283,054, in which waste liquid or partial waste liquid generated in carbonate decahydrate crystallization and separation are abandoned.

When produces the same sodium carbonate products and sodium bicarbonate products by means of the brine in step (S1) of Embodiment 1, about 330 t/h of waste liquid are generated, including about 43 t/h of sodium carbonate and 2.3 t/h of sodium bicarbonate. Meanwhile, about 23 t/h of caustic soda (100% NaOH) are consumed, which need additional 31 t/h of sodium carbonate if causticizing process is used. A utilization efficiency of sodium is about 87.8%.

Described above are only some embodiments of the present invention, which are not intended to limit the invention. It should be understood that any modifications, replacements and improvements made by those of ordinary skilled in the art without departing from the spirit of the invention should fall within the scope of the invention defined by the appended claims.

What is claimed is:

1. A soda ash and sodium bicarbonate production method, comprising:
   (S1) solution mining
   injecting water into trona ore to dissolve sodium carbonate and/or sodium bicarbonate to obtain a raw brine 1;
   (S2) pretreatment
   removing solid particles and/or total organic carbon (TOC) in the raw brine 1 to obtain a brine 2;
   (S3) stripping and concentration
   subjecting the brine 2 to stripping to convert most of sodium bicarbonate in the brine 2 to sodium carbonate and concentration to obtain a concentrated brine 3;
   (S4) decahydrate crystallization and separation
   subjecting the concentrated brine 3 to neutralization with a concentrated sodium hydroxide solution, crystallize at low-temperature in a sodium carbonate decahydrate crystallizer and separation to obtain a low liquid residual sodium carbonate decahydrate crystal and a discharge liquid 1;
   (S5) dissolution of sodium carbonate decahydrate
   dissolving the low liquid residual sodium carbonate decahydrate crystal to obtain a dissolved sodium carbonate decahydrate solution; and dividing the dissolved sodium carbonate decahydrate solution into two parts, respectively a brine 4 and a brine 5;
   (S6) sodium carbonate monohydrate crystallization, separation and drying
   subjecting the brine 4 to evaporation, concentration, crystallization in a sodium carbonate monohydrate crystallizer and separation to obtain a low liquid residual sodium carbonate monohydrate crystal and a discharge liquid 2; drying the low liquid residual sodium carbonate monohydrate crystal to obtain dense soda ash; mixing the discharge liquid 2 with the concentrated brine 3 to obtain a mixed solution; neutralizing the mixed solution; and feeding the mixed solution to the sodium carbonate decahydrate crystallizer followed by crystallization and separation;
   (S7) sodium bicarbonate crystallization, separation and drying
   subjecting the brine 5 to carbonation reaction with carbon dioxide in a sodium bicarbonate crystallizer, cooling, crystallization and separation to obtain a low liquid residual sodium bicarbonate crystal and a discharge liquid 3, wherein the discharge liquid 3 is collected to be used in step (S3) and/or step (S1); and drying the sodium bicarbonate crystal to obtain sodium bicarbonate;
   (S8) causticization
   subjecting the discharge liquid 1 and lime milk to causticization, followed by clarification and separation to obtain a low NaOH content solution and causticized sludge; and subjecting the causticized sludge to washing and calcination to obtain quick lime to be reused for causticization; and
   (S9) evaporation
   subjecting the NaOH solution to evaporation and concentration to remove impurities to obtain a concentrated NaOH solution, wherein the concentrated NaOH solution is used for neutralization of residual sodium bicarbonate in the concentrated brine 3 and discharge liquid 2.

2. The soda ash and sodium bicarbonate production method according to claim 1, characterized in that condensates generated in step (S3) and step (S6) are collected for solution mining.

3. The soda ash and sodium bicarbonate production method according to claim 1, further comprising:
   removing TOC in the discharge liquid 1; and/or
   removing TOC in the low NaOH content solution obtained in step (S8) or the concentrated NaOH solution obtained in step (S9).

4. The soda ash and sodium bicarbonate production method according to claim 3, characterized in that the TOC is removed through activated carbon adsorption, ozonation or resin adsorption.

5. The soda ash and sodium bicarbonate production method according to claim 1, characterized in that a total alkali of the concentrated brine 3 is 22-28 wt. % in terms of sodium carbonate.

6. The soda ash and sodium bicarbonate production method according to claim 1, characterized in that in step (S5), the sodium carbonate decahydrate crystal is dissolved with the brine 2, a condensate generated in step (S6), a condensate generated in step (S3), stripped brine generated in step (S3) or a combination thereof.

7. The soda ash and sodium bicarbonate production method according to claim 1, characterized in that $CO_2$ in step (S3) is collected for the carbonation reaction in step (S7); and in step (S7), the brine for crystallization is replaced with the concentrated brine 3, or a mixed solution of the concentrated brine 3 and the brine 5.

8. The soda ash and sodium bicarbonate production method according to claim 1, characterized in that a concentrated NaOH solution obtained in step (S9) is 20-35 wt %, preferably 25-30 wt %.

9. The soda ash and sodium bicarbonate production method according to claim 1, characterized in that the sodium carbonate decahydrate crystallization comprises two-stage flash evaporators and a crystallizer; the neutralized mixed solution of the discharge liquid 2 and the concentrated brine 3 sequentially passes through the two-stage flash evaporators and the crystallizer for crystallization to obtain sodium carbonate decahydrate; and the second-stage flash evaporator and crystallizer are both equipped with a bottom stirring mechanism.

10. The soda ash and sodium bicarbonate production method according to claim 1, characterized in that in step (S4), a refrigerating system is provided for cooling during sodium carbonate decahydrate crystallization and separation, and for supplying heat to dissolve sodium carbonate decahydrate; and a condenser at outlet of the compressor of the refrigerating system is a two-stage series condenser, wherein the first-stage condenser unit is configured to take a dissolved sodium carbonate decahydrate solution containing sodium carbonate decahydrate crystal as a cooling source.

\* \* \* \* \*